US011393050B2

(12) United States Patent
Katsumura et al.

(10) Patent No.: US 11,393,050 B2
(45) Date of Patent: Jul. 19, 2022

(54) RESOURCE ACCOMMODATION DEVICE, SCHEDULE MANAGEMENT DEVICE, AND RESOURCE ACCOMMODATION SYSTEM

(71) Applicant: HITACHI, LTD., Tokyo (JP)

(72) Inventors: Yoshiteru Katsumura, Tokyo (JP); Yuuichi Suginishi, Tokyo (JP); Takahiro Iwata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 670 days.

(21) Appl. No.: 15/554,100

(22) PCT Filed: Dec. 22, 2015

(86) PCT No.: PCT/JP2015/085860
§ 371 (c)(1),
(2) Date: Aug. 28, 2017

(87) PCT Pub. No.: WO2017/108863
PCT Pub. Date: Jun. 29, 2017

(65) Prior Publication Data
US 2018/0053262 A1    Feb. 22, 2018

(51) Int. Cl.
*G06Q 30/00*       (2012.01)
*G06Q 50/04*       (2012.01)
*G06Q 10/06*       (2012.01)

(52) U.S. Cl.
CPC ............ *G06Q 50/04* (2013.01); *G06Q 10/06* (2013.01); *G06Q 10/06313* (2013.01); *G06Q 10/06314* (2013.01); *Y02P 90/30* (2015.11)

(58) Field of Classification Search
CPC .. G06Q 50/04; G06Q 10/06; G06Q 10/06313; G06Q 10/06314; G06Q 50/08;
(Continued)

(56) References Cited

U.S. PATENT DOCUMENTS 5,093,794 A * 3/1992 Howie ............... G06Q 10/06
700/100
5,128,860 A * 7/1992 Chapman ........... G06Q 10/06
700/99
(Continued)

FOREIGN PATENT DOCUMENTS

EP           3073424 A1 * 9/2016 ........... G05B 19/406
JP     2005-234931 A    9/2005
(Continued)

OTHER PUBLICATIONS

Stecke et al., Profit-based FMS dynamic part type selection over time for mid-term production planning, European Journal of Operational Research, 63 (1992) 54-65 (Year: 1992).*

*Primary Examiner* — Patricia H Munson
*Assistant Examiner* — Uche Byrd
(74) *Attorney, Agent, or Firm* — Miles & Stockbridge, P.C.

(57) ABSTRACT

Provided is a technique for executing production planning having appropriate responsiveness even when the number of participating companies accommodating resources is increased.

A resource accommodation device includes: a resource registration receiving unit that stores a resource registration request including a type of an available resource and an available date and time in a schedule storage unit of a predetermined resource upon receiving the resource registration request; and a resource candidate presentation unit that searches through resources stored in the schedule storage unit upon receiving a type of a requested resource and a date and time of using the resource, selects a resource satisfying a predetermined criterion, and presents the resource as a resource candidate having been selected.

14 Claims, 13 Drawing Sheets

(58) Field of Classification Search
CPC ......... G06Q 10/0631; G06Q 10/06312; G06Q 10/06315; Y02P 90/30
See application file for complete search history.

(56) References Cited

U.S. PATENT DOCUMENTS

| | | | | |
|---|---|---|---|---|
| 5,630,070 | A * | 5/1997 | Dietrich | G06Q 10/06 705/7.23 |
| 5,826,040 | A * | 10/1998 | Fargher | G06Q 10/06 705/7.24 |
| 5,953,707 | A * | 9/1999 | Huang | G06Q 10/06 705/7.25 |
| 5,971,585 | A * | 10/1999 | Dangat | G06Q 10/06 700/102 |
| 6,151,582 | A * | 11/2000 | Huang | G06Q 10/06 705/7.25 |
| 6,195,590 | B1 * | 2/2001 | Powell | G06Q 10/06 700/36 |
| 6,591,153 | B2 * | 7/2003 | Crampton | G06Q 10/06 700/103 |
| 6,959,268 | B1 * | 10/2005 | Myers Jr. | G06Q 10/10 703/6 |
| 7,058,587 | B1 * | 6/2006 | Horne | G06Q 10/06 705/7.22 |
| 7,539,630 | B2 * | 5/2009 | Crampton | G06Q 10/06 705/26.1 |
| 8,027,849 | B2 * | 9/2011 | Johnson | G06Q 10/1095 705/2 |
| 8,117,052 | B2 * | 2/2012 | Chung | G06Q 10/0631 705/7.11 |
| 8,266,066 | B1 * | 9/2012 | Wezter | G06Q 10/06 705/78 |
| 9,864,960 | B2 * | 1/2018 | Bergantino | G06Q 10/06 |
| 10,146,214 | B2 * | 12/2018 | Linton | G06Q 10/06315 |
| 2003/0109950 | A1 * | 6/2003 | Andrade, Jr. | G06Q 10/06 700/103 |
| 2003/0154144 | A1 * | 8/2003 | Pokorny | G06Q 10/10 705/28 |
| 2004/0153437 | A1 * | 8/2004 | Buchan | G06Q 10/06 |
| 2005/0188191 | A1 | 8/2005 | Yoshida et al. | |
| 2007/0260502 | A1 | 11/2007 | Motwani et al. | |
| 2008/0086357 | A1 | 4/2008 | Choubey et al. | |
| 2010/0128040 | A1 | 5/2010 | Lynam | |
| 2011/0145415 | A1 | 6/2011 | Osaki et al. | |
| 2015/0046363 | A1 * | 2/2015 | McNamara | G06Q 10/0635 705/333 |
| 2015/0324740 | A1 * | 11/2015 | Shao | G06Q 50/06 705/331 |

FOREIGN PATENT DOCUMENTS

| | | |
|---|---|---|
| JP | 2006-48376 A | 2/2006 |
| JP | 2009-535739 A | 10/2009 |
| JP | 2011-123812 A | 6/2011 |
| JP | 2012-510124 A | 4/2012 |
| JP | 2014-002576 A | 1/2014 |
| JP | 2014-203359 A | 10/2014 |

* cited by examiner

FIG.2

CLIENT MANAGEMENT INFORMATION STORAGE UNIT 131A  131B  131C  131

| OFFICE NAME | ADDRESS | SETTLEMENT ACCOUNT | ... |
|---|---|---|---|
| N1 | A1 | AS1 | ... |
| N2 | A2 | AS2 | ... |
| N3 | A3 | AS3 | ... |
| ... | ... | ... | ... |

FIG.4

SCHEDULE STORAGE UNIT  133

| RESOURCE 133A | SURPLUS PERIOD 133B | ACCOMMODATION SCHEDULED PERIOD 133C | ... |
|---|---|---|---|
| RS1 | ST1 | DT1 | ... |
| RS2 | ST2 | DT2 | ... |
| ... | ... | ... | ... |

FIG.6

FREE RESOURCE INFORMATION STORAGE UNIT ~231

| RESOURCE | SURPLUS PERIOD | ACCOMMODATION SCHEDULED PERIOD | ... |
|---|---|---|---|
| RS1 | ST1 | DT1 | ... |
| RS2 | ST2 | DT2 | ... |
| ... | ... | ... | ... |

COST UPPER LIMIT STORAGE DEVICE  ~233

| RESOURCE NAME | REQUESTED UNIT PRICE | UPPER LIMIT UNIT PRICE | ... |
|---|---|---|---|
| RS1 | IP1 | UP1 | ... |
| RS2 | IP2 | UP2 | ... |
| ... | ... | ... | ... |

233A / 233B / 233C

RESOURCE ACCOMMODATION DEVICE, SCHEDULE MANAGEMENT DEVICE, AND RESOURCE ACCOMMODATION SYSTEM

TECHNICAL FIELD

The present invention relates to a resource accommodation device, a schedule management device, and a resource accommodation system.

BACKGROUND ART

Patent Literature 1 discloses "a scheduling device comprising: a use request database configured to store content of a request for using a shared resource; an unavailable time database configured to store information of unavailable time being a period of time from when any request starts to use the shared resource and during which the next request is unable to use the shared resource; a schedule evaluation value calculation unit configured to calculate an evaluation value indicating a degree of evaluation of a use schedule of the shared resource having been input; a scheduling processing unit configured to generate the use schedule of the shared resource, based on the content of the request in the use request database and on the unavailable time in the unavailable time database, for an arrangement of a plurality of requests such that a use start time of the shared resource by the plurality of requests is a time other than the unavailable time, and to output the use schedule by adding the evaluation value by the schedule evaluation value calculation unit thereto; an initial schedule generation unit configured to generate the arrangement of the requests by referring to the use request database, and to output the use schedule generated by the scheduling processing unit for the arrangement of the requests as an initial schedule; a grouping rule database configured to store a rule for grouping the requests; a grouping processing unit configured to group the requests by referring to the rule of the grouping rule database and based on the schedule having been input by the initial schedule generation unit; and an optimization execution unit configured to change the schedule for each group of the requests so as to improve evaluation of the schedule having been grouped by the grouping processing unit".

CITATION LIST

Patent Literature

Patent Literature 1: JP 2014-002576 A

SUMMARY OF INVENTION

Technical Problem

In the above-described technique, generation of a schedule is centrally processed in the scheduling device. Thus, as the number of related schedules increases, or as the number of participating companies increases, combinations of resources become diverse, resulting in increasing an amount of calculation related to the schedule in geometrical series.

An objective of the present invention is to provide a technique for executing production planning having appropriate responsiveness even when the number of participating companies accommodating resources is increased.

Solution to Problem

The present application includes more than one solution to at least a part of the above-described problem, and an example thereof is described hereinafter. To solve the above-described problem, a resource accommodation device according to the present invention includes: a resource registration receiving unit that stores a resource registration request including a type of an available resource and an available date and time in a schedule storage unit of a predetermined resource upon receiving the resource registration request; and a resource candidate presentation unit that searches through resources stored in the schedule storage unit upon receiving a type of a requested resource and a date and time of using the resource, selects a resource satisfying a predetermined criterion, and presents the resource as a resource candidate that has been selected.

Advantageous Effects of Invention

According to the present invention, it is possible to execute the production planning having appropriate responsiveness even when the number of participating companies accommodating resources is increased. Any problem, configuration, and effect other than the ones described above are clarified in descriptions of embodiments hereinafter.

BRIEF DESCRIPTION OF DRAWINGS

FIG. 2 is a table illustrating a data structure stored in a client management information storage unit.

FIG. 4 is a table illustrating a data structure stored in a schedule storage unit.

FIG. 6 is a table illustrating a data structure stored in a free resource information storage unit.

FIG. 8 is a table illustrating a data structure stored in a cost upper limit storage unit.

DESCRIPTION OF EMBODIMENTS

Figure 1:
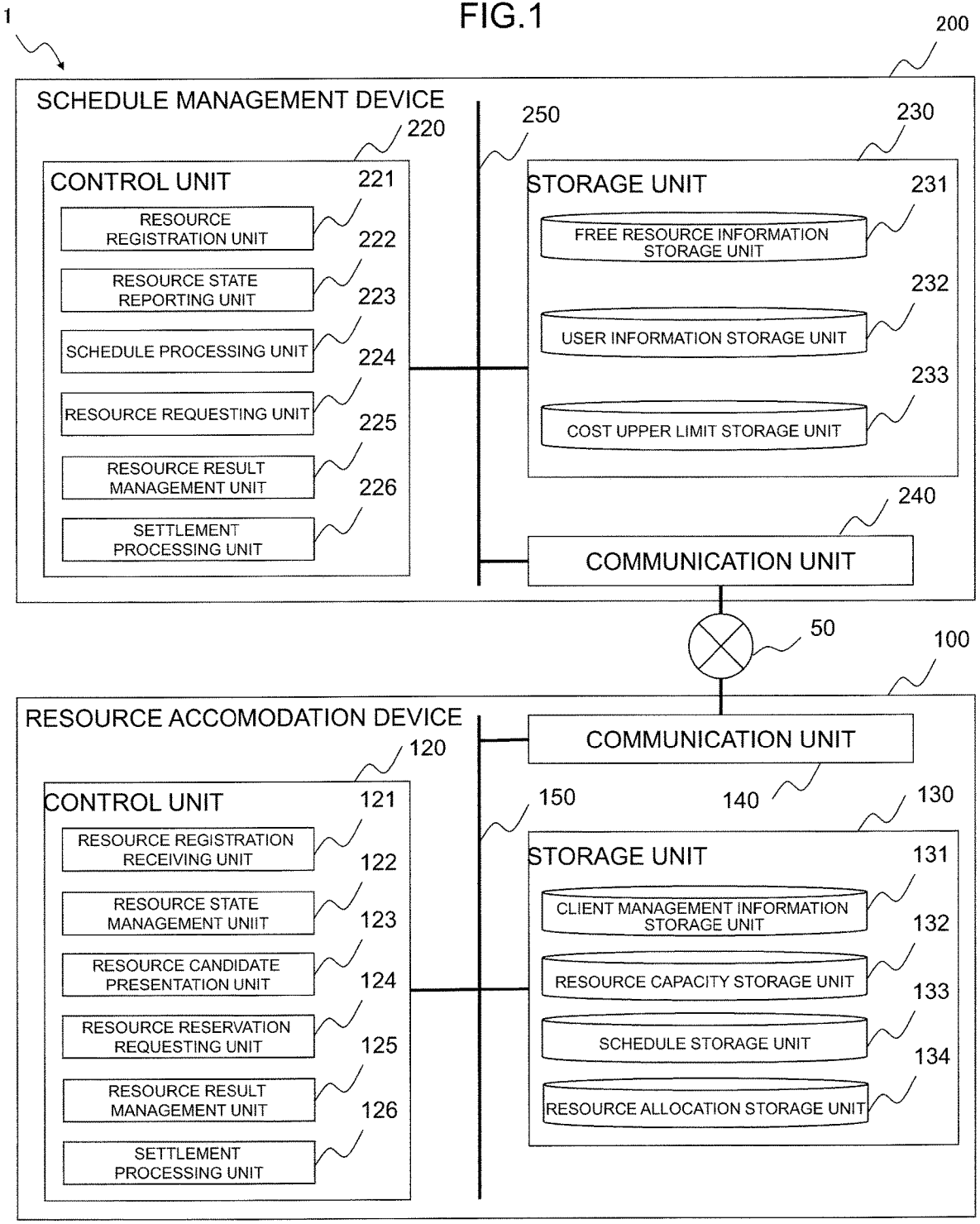
FIG. 1 is a diagram illustrating an outline of a resource accommodation system according to an embodiment of the present invention.

Hereinafter, an embodiment of the present invention is described with reference to the drawings. Note that in all of the drawings for describing the embodiment, in general, the same member is denoted by the same reference numeral, and a repeated description thereof is omitted. Note that a resource according to the present invention is a thing in general that is required in a manufacturing process of a product. A specific example of the resource includes, but is not limited to, any of manufacturing equipment, manufacturing personnel, and manufacturing-related work.

Hereinafter, an exemplary resource accommodation system 1 according to a first embodiment of the present invention is described with reference to the drawings.

FIG. 1 is a diagram illustrating an outline of the resource accommodation system 1 according to the present invention. The resource accommodation system 1 includes a resource accommodation device 100, and a schedule management device 200 communicably connected to the resource accommodation device 100 through a network 50. The resource accommodation device 100 is constituted of a control unit 120, a storage unit 130, a communication unit 140, and a communication bus 150 linking these units. The schedule management device 200 is constituted of a control unit 220, a storage unit 230, a communication unit 240, and a communication bus 250 linking these units.

Note that a user (e.g. production planner) can use a function of the resource accommodation device 100 and the schedule management device 200 by operating an input-output device or a remote input-output device that is not illustrated. The resource accommodation device 100 and the schedule management device 200 may be constituted of a general calculator (e.g. PC), and a characteristic processing function thereof may be achieved by software program processing, for example.

In this system, a graphical user interface (GUI) is constituted on a screen that is displayed on an output device based on processing in an input device and the control unit 120, and various information is displayed thereon.

The control unit 120 of the resource accommodation device 100 includes a resource registration receiving unit 121, a resource state management unit 122, a resource candidate presentation unit 123, a resource reservation requesting unit 124, a resource result management unit 125, and a settlement processing unit 126.

The resource registration receiving unit 121 stores a resource registration request including a type of an available resource and an available date and time in a schedule storage unit 133 upon receiving the resource registration request.

The resource state management unit 122 manages a state of a resource by storing the state thereof at a predetermined time in the schedule storage unit 133 (including an accommodation available period).

The resource candidate presentation unit 123 searches through resources stored in the schedule storage unit 133 upon receiving a type of a requested resource and a date and time of using the resource, selects a resource satisfying a predetermined criterion, and presents the resource as a resource candidate that has been selected. Note that it is preferred that the predetermined criterion be a criterion related to a cost of the resource obtained as a result of a search.

For example, the criterion used by the resource candidate presentation unit 123 for selecting a resource may be that, by reading a resource capacity storage unit 132 that stores a resource in association with information specifying a unit price for using the resource, the unit price is lower than a predetermined amount. The criterion used by the resource candidate presentation unit 123 for selecting a resource may also be that, by reading the resource capacity storage unit 132 that stores a resource in association with information specifying a position thereof, a transportation cost calculated using the information specifying the position and using a predetermined method is the lowest among resources that have been searched. Furthermore, the criterion used by the resource candidate presentation unit 123 for selecting a resource may also be that a transportation period calculated using the information specifying the position of the resource and using a predetermined method is the shortest among the resources that have been searched.

Among the resource candidates, for the resource that is actually incorporated into a schedule, the resource reservation requesting unit 124 makes a reservation request including information specifying a date and time, an amount of use, and a requestor of reservation to a subject providing the resource.

The resource result management unit 125 records whether or not the resource that has been reserved is actually used, and manages information that serves as a basis of calculation of a usage fee and the like that are charged.

The settlement processing unit 126 performs settlement processing of the usage fee and the like using the information managed by the resource result management unit 125. Note that the settlement processing unit 126 may also be a unit that collects information for using a settlement processing function of an external settlement server and the like and that sends the information to the settlement server.

The storage unit 130 is constituted of, for example, a known element such as a hard disk drive (HDD) and a solid state drive (SSD). The storage unit 130 includes a client management information storage unit 131, the resource capacity storage unit 132, the schedule storage unit 133, and a resource allocation storage unit 134.

FIG. 2 is a table illustrating a data structure stored in the client management information storage unit 131. The client management information storage unit 131 stores management information of each client, or each office. The management information is information for managing various profile data such as an address, a settlement account, and a contact person of the office. The client management information storage unit 131 includes an office name 131A, an address 131B, and a settlement account 131C.

The office name 131A is information that specifies the office. The office either has no resource or has one or more resources that can be accommodated to another office. The office may also receive accommodation of a resource from the other office.

The address 131B is information that specifies a location or a substantial position of the office specified by the office name 131A.

The settlement account 131C is information that specifies an account for settlement at a financial institution of the office specified by the office name 131A.

Figure 3:
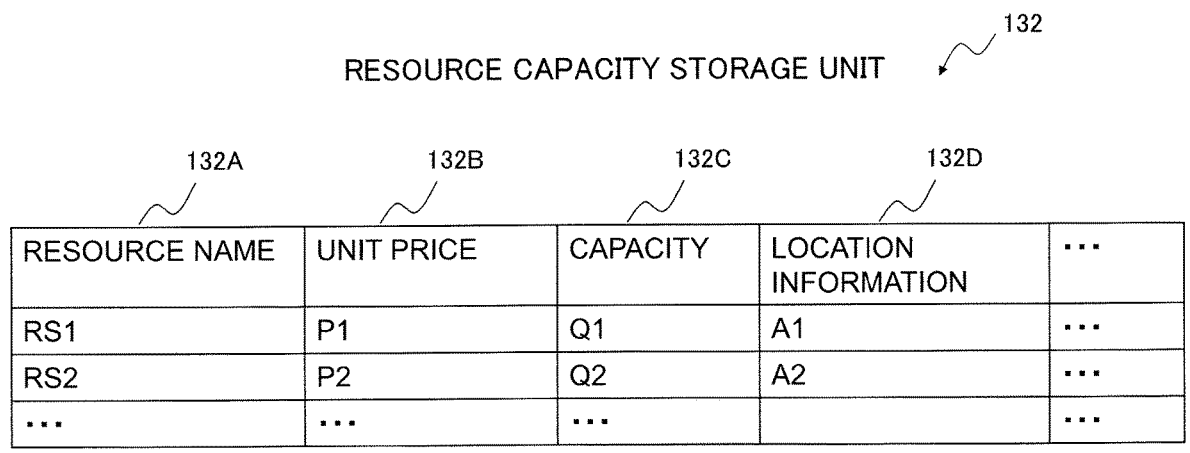
FIG. 3 is a table illustrating a data structure stored in a resource capacity storage unit.

FIG. 3 is a table illustrating a data structure stored in the resource capacity storage unit 132. The resource capacity storage unit 132 stores information related to capacity of the resource and a unit price for using the resource. Specifically, the resource capacity storage unit 132 includes a resource name 132A, a unit price 132B, capacity 132C, and location information 132D.

The resource name 132A is information for identifying the resource. The resource name, for example, may include a name of a process, a name of equipment to be used, a name of a worker who carries out the process, and a name of a secondary material such as a tool used in a work.

The unit price 132B is information that specifies the unit price for using the resource. The unit price is an amount that serves as a basis of calculation of the usage fee that increases with a usage amount of the resource; however, the unit price is not limited to this and may also be the usage fee that is charged regardless of the usage amount. That is, it can be said that information specifying a fee charged as a result of using the resource is stored in the unit price 132B.

The capacity 132C is information indicating capacity of the resource such as a limit capacity, a minimum capacity, and an average capacity depending on the resource. For example, in a case where the resource is "lifting by a crane", it may be a limit loading capacity, and in a case where the resource is "casting", it may be a minimum order quantity.

The location information 132D is information indicating a position where the resource is disposed. Preferably, it is an address indicating a location of the resource, for example; however, it is not limited to this and may also be position information of a global positioning system (GPS).

FIG. 4 is a table illustrating a data structure stored in the schedule storage unit 133. The schedule storage unit 133 stores information that specifies a surplus period and an accommodation scheduled period of each of the resources. Specifically, the schedule storage unit 133 includes a resource 133A, a surplus period 133B, and an accommodation scheduled period 133C.

The resource 133A is information that specifies the resource. The surplus period 133B is information that specifies a date and time zone having no schedule of using the resource among schedules of using the resource that are specified by the resource 133A. For example, in the surplus period 133B, information such as "night on weekdays" is stored. The accommodation scheduled period 133C is information that specifies a period to be available for accommodation among the date and time zones having no schedule of using the resource specified by the resource 133A. For example, in the accommodation scheduled period 133C, information that specifies a period such as "Dec. 20, 2015 to Jan. 10, 2016" is stored.

Figure 5:
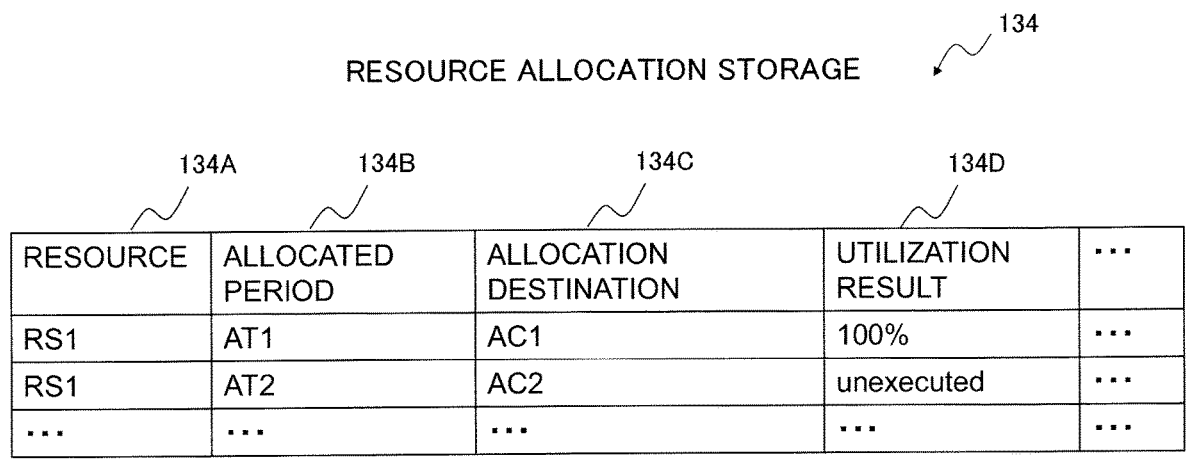
FIG. 5 is a table illustrating a data structure stored in a resource allocation storage unit.

FIG. 5 is a table illustrating a data structure stored in the resource allocation storage unit 134. The resource allocation storage unit 134 stores information that specifies an allocated period, an allocation destination, and a use result of each of the resources. Specifically, the resource allocation storage unit 134 includes a resource 134A, an allocated period 134B, an allocation destination 134C, and a utilization result 134D.

The resource 134A is information that specifies the resource. The allocated period 134B is information that specifies a period allocated to a user requesting to use the resource among the date and time zones having no schedule of using the resource specified by the resource 134A. For example, in the allocated period 134B, information that specifies a period such as "Dec. 26, 2015 to Jan. 4, 2016" is stored. In the allocation destination 134C, information that specifies a business operator, to which use of the resource specified by the resource 134A is allocated, is stored. In the utilization result 134D, information that specifies whether or not the business operator, to which use of the resource is allocated, has actually used the resource during the allocated period is stored. Not limited to this, it is also possible to store information that specifies a result of the usage amount of the resource in the utilization result 134D.

Note that the storage unit 130 may also be provided to another device that is connected through the network 50 or a network (not illustrated), and the control unit 120 may also be a unit that accesses information stored in the storage unit 130 through communication (e.g. storage area network (SAN) or network access storage (NAS)).

The communication unit 140 performs communication with one or more schedule management devices 200, which are another devices, through the network 50. Note that the network 50 may be any of various networks such as the Internet, a local area network (LAN), a wide area network (WAN), a mobile phone network, and a wireless communication network, for example.

The control unit 220 of the schedule management device 200 includes a resource registration unit 221, a resource state reporting unit 222, a schedule processing unit 223, a resource requesting unit 224, a resource result management unit 225, and a settlement processing unit 226.

The resource registration unit 221 sends the resource registration request including the type of the available resource and the available date and time to the resource accommodation device 100.

The resource state reporting unit 222 reports a state of the resource by sending the state thereof at a predetermined time (including the accommodation available period) to the resource accommodation device 100.

The schedule processing unit 223 receives a manufacturing process and a production volume of a product to be manufactured, and calculates a schedule by a predetermined method using information that specifies a type of a resource required for manufacturing the product and an available period of the resource. In calculation of the schedule, in addition to the resource possessed by a business entity, the resource candidate obtained by the resource requesting unit 224 from the resource accommodation device 100 is included, and it is preferred that the calculation be performed by including various arithmetic operations related to supply chain management. The schedule calculated in this way includes the resource to be used and the date and time of using the resource.

In a case where a requirement of the production volume is not satisfied by the schedule that has been calculated, the resource requesting unit 224 outputs a resource use request including a type of an insufficient resource and a date and time of using the resource.

The resource result management unit 225 records whether or not the resource that has been reserved is actually used, and manages information that serves as a basis of calculation of the usage fee and the like that are charged.

The settlement processing unit 226 performs settlement processing of the usage fee and the like using the information managed by the resource result management unit 225. Note that the settlement processing unit 226 may also be a unit that collects information for using a settlement processing function of an external settlement server and the like and that sends the information to the settlement server.

The storage unit 230 is constituted of, for example, a known element such as a HDD and a SSD. The storage unit 230 includes a free resource information storage unit 231, a user information storage unit 232, and a cost upper limit storage unit 233.

FIG. 6 is a table illustrating a data structure stored in the free resource information storage unit 231. The free resource information storage unit 231 stores information that specifies a surplus period and an accommodation scheduled period of each of the resources. Specifically, the free resource information storage unit 231 includes a resource 231A, a surplus period 231B, and an accommodation scheduled period 231C.

The resource 231A is information that specifies the resource. The surplus period 231B is information that specifies a date and time zone having no schedule of using the resource among schedules of using the resource that are specified by the resource 231A. For example, in the surplus period 231B, information such as "night on weekdays" is stored. The accommodation scheduled period 231C is information that specifies a period to be available for accommodation among the date and time zones having no schedule of using the resource specified by the resource 231A. For example, in the accommodation scheduled period 231C, information that specifies a period such as "Dec. 20, 2015 to Jan. 10, 2016" is stored.

Figure 7:
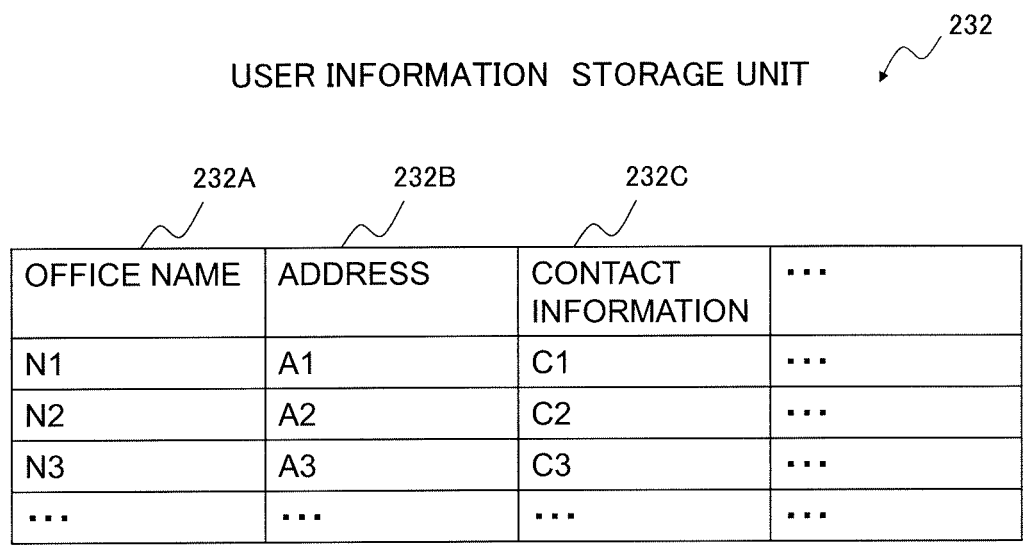
FIG. 7 is a table illustrating a data structure stored in a user information storage unit.

FIG. 7 is a table illustrating a data structure stored in the user information storage unit 232. The user information storage unit 232 stores management information of each user, or another client office. The management information is information for managing various profile data such as an address and contact information of the office. The user information storage unit 232 includes an office name 232A, an address 232B, and contact information 232C.

The office name 232A is information that specifies the office. The office either has no resource or has one or more resources that can be accommodated to another office. The office may also receive accommodation of a resource from the other office.

The address 232B is information that specifies a location or a substantial position of the office specified by the office name 232A.

The contact information 232C is information that specifies contact information of the office specified by the office name 232A.

FIG. 8 is a table illustrating a data structure stored in the cost upper limit storage unit 233. The cost upper limit storage unit 233 stores a resource in association with a requested unit price and an upper limit unit price as the usage fee of the resource. Specifically, the cost upper limit storage unit 233 includes a resource name 233A, a requested unit price 233B, and an upper limit unit price 233C.

The resource name 233A is information that specifies the resource. The requested unit price 233B is information of a unit price requested as the unit price for using the resource specified by the resource name 233A. The upper limit unit price 233C is information of the upper limit unit price that is acceptable regardless of another condition as the unit price for using the resource specified by the resource name 233A.

Note that the storage unit 230 may also be provided to another device that is connected through the network 50 or a network (not illustrated), and the control unit 220 may also be a unit that accesses information stored in the storage unit 230 through communication (e.g. storage area network (SAN) or network access storage (NAS)).

The communication unit 240 performs communication with one or more resource accommodation devices 100, which are another devices, through the network 50.

Figure 9:
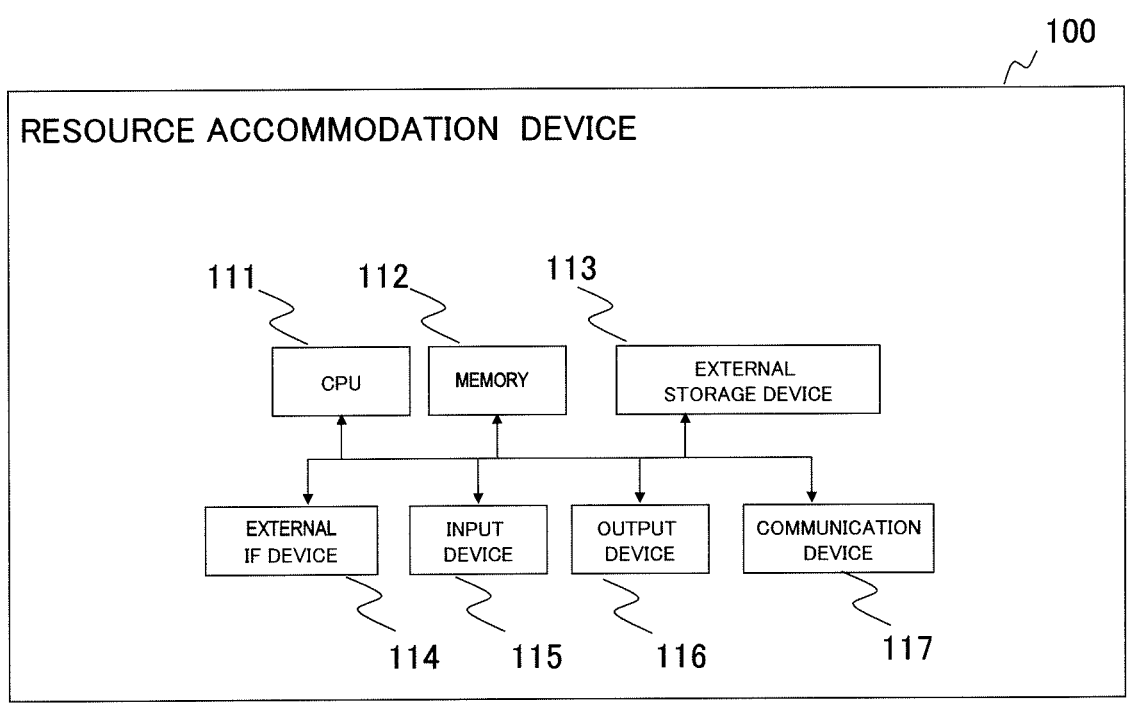
FIG. 9 is a diagram illustrating a hardware configuration of a resource accommodation device.

FIG. 9 is a diagram illustrating a hardware configuration of the resource accommodation device 100. The resource accommodation device 100 is typically a server device or a personal computer device but is not limited to this, and it may also be an electronic information terminal such as a smart phone, a mobile phone terminal, a personal digital assistant (PDA), and a tablet PC.

The resource accommodation device 100 is constituted of: a calculation device such as a central processing unit (CPU) 111; a main storage device such as a memory 112; an external storage device 113 such as a hard disk drive and a solid state drive (SSD); an external interface (IF) device 114 communicably connected to a device that reads and writes electronic data from and to a portable storage medium such as a compact disk (CD) and a digital versatile disk (DVD); an input device 115 such as a keyboard and a mouse; an output device 116 such as a display and a printer; a communication device 117 such as a network interface card (NIC); and a bus that connects these devices.

The communication device 117 is either a wired communication device that performs wired communication by a network cable or a wireless communication device that performs wireless communication by an antenna. The communication device 117 performs communication with another device connected to the network 50 or the like.

The main storage device is the memory 112 such as a random access memory (RAM), for example. The external storage device 113 is a non-volatile storage device capable of storing digital information such as a so-called hard disk drive, SSD, and a flash memory.

The input device 115 is a device for receiving input information including a pointing device such as a keyboard and a mouse.

The output device 116 is a device for generating output information including a display and a printer.

The above-described control unit 120 is achieved by a program that causes the CPU 111 to perform processing. The program is stored in the memory 112, the external storage device 113, or a portable storage medium. At the time of execution, the program is loaded into the memory 112 and is executed by the CPU 111.

The storage unit 130 is achieved by the memory 112 and the external storage device 113.

The communication unit 140 is achieved by the communication device 117. The input-output device is achieved by the input device 115 and the output device 116.

The exemplary hardware configuration of the resource accommodation device 100 of the resource accommodation system 1 according to this embodiment has been described as above; however, the hardware configuration thereof is not limited to this and may also be configured by using another hardware.

Furthermore, each of the storage units stored in the storage unit 130 may also be a unit that updates information by collecting information stored in another server device and an external storage device that are connected to a network by crawling or may also be a unit that updates information by receiving data sent from another device.

Note that the resource accommodation device 100 includes a known element such as an operating system (OS), middleware, and an application that are not illustrated, and in particular, it includes an existing processing function for displaying a GUI screen on the input-output device such as a display. Using the above-described existing processing function, the control unit 120 performs processing for rendering and displaying a predetermined screen, processing of data information that is input by a user through the screen, and the like.

The schedule management device 200 basically has the same hardware configuration as that of the resource accommodation device 100. Thus, a detailed description thereof is omitted herein.

[Description of Operation]

Next, operation of the resource accommodation system 1 according to this embodiment is described.

Figure 10:
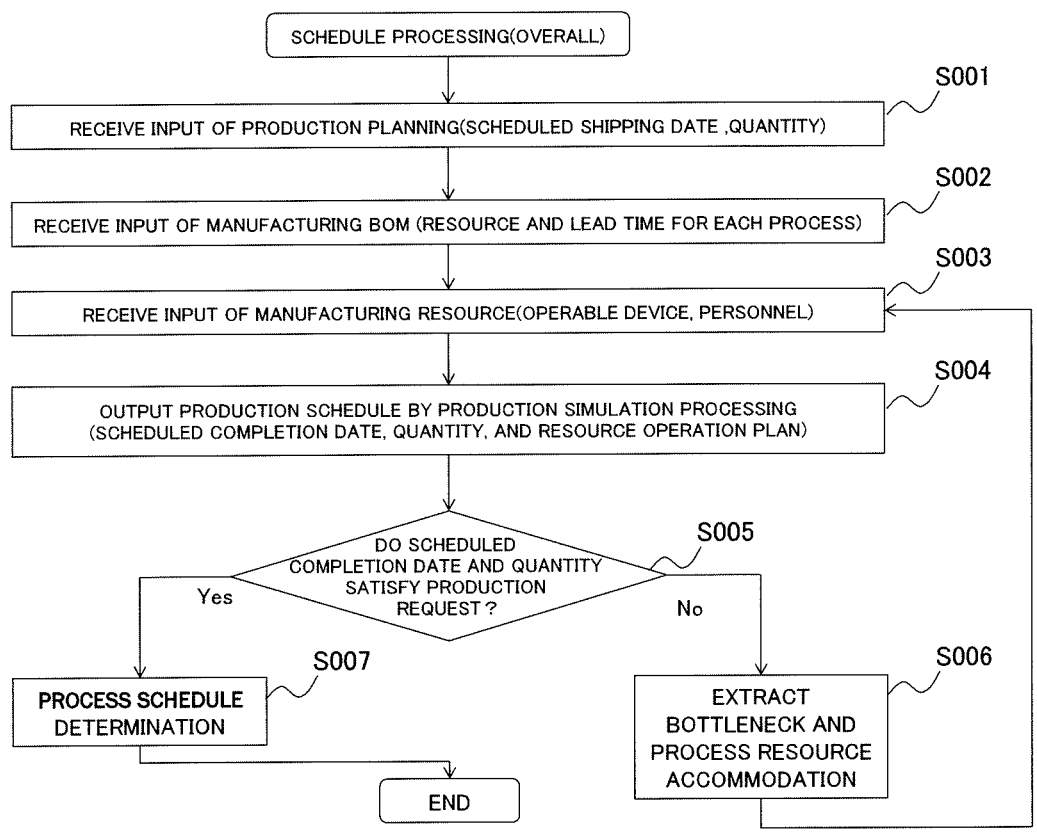
FIG. 10 is a flowchart illustrating an operation flow of schedule processing (overall).

FIG. 10 is a flowchart illustrating an operation flow of schedule processing (overall). The schedule processing (overall) according to this embodiment is executed by the resource accommodation device 100 and the schedule management device 200. The operation flow of the schedule processing (overall) is started upon receiving a start instruction of the schedule processing from a user (e.g. production planner) in a state where the resource accommodation device 100 and the schedule management device 200 are operating.

The schedule processing unit 223 of the schedule management device 200 receives input of production planning (scheduled shipping date, quantity) (step S001). Specifically, the schedule processing unit 223 receives various information related to the production planning including at least the scheduled shipping date and the quantity to be produced.

Next, the schedule processing unit 223 receives input of a manufacturing bill of materials (BOM) (including a resource and a lead time thereof for each process) (step S002). Specifically, the schedule processing unit 223 receives designation of a read destination of the manufacturing BOM, for example, as information that specifies a component configuration constituting a produced item, which is an object of the production planning. The manufacturing BOM includes at least information related to manufacturing such as the process, the resource used in the process, and the lead time.

Then, the schedule processing unit 223 performs processing for receiving input of a manufacturing resource (operable device, personnel) (step S003). Specifically, the schedule processing unit 223 receives the input of equipment, the process, the personnel, a secondary material, and the like as the resources possessed by itself. In a case where a resource is accommodated by the resource accommodation device 100 in step S006, the schedule processing unit 223 also receives input of the accommodated resource.

Next, the schedule processing unit 223 outputs a production schedule (including a scheduled completion date, a quantity, and a resource operation plan) by production simulation processing (step S004). Specifically, the schedule processing unit 223 performs the production simulation processing by a predetermined algorithm. For example, the production simulation processing is performed according to business content of a business operator that manages the schedule thereof by the schedule management device 200. The production simulation processing may also be processing of giving an instruction for operating, on another device, processing that is operating on the other device by the schedule processing unit 223. It is preferred that various processing performed in supply chain management and another system such as a logistic system, a stock management system, and a financial management system as well as optimization processing be performed on a part of the production simulation processing.

Then, the schedule processing unit 223 determines whether or not the production schedule satisfies the scheduled completion date while the quantity satisfies a production request (step S005). Specifically, for each of the produced items, the schedule processing unit 223 determines whether or not the scheduled completion date and the quantity of the production schedule, which has been output in step S004, satisfy the production planning, which has been received in step S001.

In a case where the production request is not satisfied (in a case where step S005 is "No"), the resource requesting unit 224 performs bottleneck extraction processing and performs resource accommodation processing (step S006). Specifically, the resource requesting unit 224 specifies a resource having an operation rate of 100 percent (a resource with all of operating time thereof used for production) in the production schedule, extracts resources of the same type as the resource and a period thereof, which are included in a resource accommodation request, and sends the resource accommodation request to the resource accommodation device 100. Not limited to the resource having the operation rate of 100 percent, the resource requesting unit 224 may also extract a resource having the operation rate exceeding a predetermined value as a bottleneck and may include it in the resource accommodation request. Then, the resource requesting unit 224 receives the resource candidate from the resource accommodation device 100, whereby control is returned to step S003.

In a case where the production request is satisfied (in a case where step S005 is "Yes"), the schedule processing unit 223 performs schedule determination processing (step S007). Specifically, for each of the resources included in the production schedule, the schedule processing unit 223 determines a date and time of using the resource. In the processing, in a case where the resource that is accommodated by the resource accommodation device 100 is included in the production schedule, to make a reservation of the resource, the schedule processing unit 223 sends a determination request of the resource to be accommodated to the resource accommodation device 100. Then, the schedule processing unit 223 ends the schedule processing (overall).

The operation flow of the schedule processing (overall) has been described as above. According to the schedule processing (overall), the production simulation processing for outputting the production schedule is performed in each of the schedule management devices 200, whereby it is possible to execute the production planning having appropriate responsiveness even when the number of participating companies accommodating resources is increased.

Figure 11:
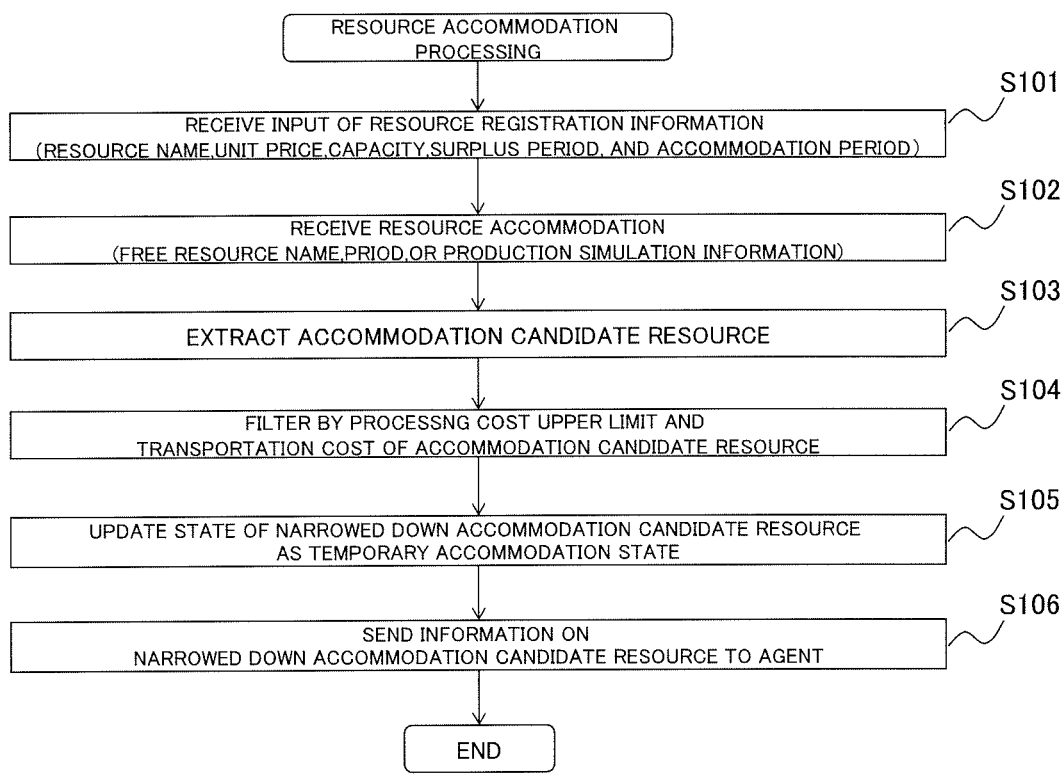
FIG. 11 is a flowchart illustrating an operation flow of resource accommodation processing.

FIG. 11 is a flowchart illustrating an operation flow of the resource accommodation processing. The resource accommodation processing according to this embodiment is executed by the resource accommodation device 100. The operation flow of the resource accommodation processing is started upon receiving a start instruction of the resource accommodation processing from the schedule management device 200 in a state where the resource accommodation device 100 and the schedule management device 200 are operating.

First, the resource registration receiving unit 121 receives input of resource registration information (a resource name, a unit price, capacity, a surplus period, and an accommodation period) (step S101). Then, the resource registration receiving unit 121 stores the resource registration information that has been received into each of the resource capacity storage unit 132 and the schedule storage unit 133. It is also possible not to perform this input processing in a case where there are sufficient registrations of the resources that are registered in advance.

Next, the resource candidate presentation unit 123 receives the resource accommodation request (a resource name or a resource type, a resource keyword, and the like and a period of requesting resource accommodation or production simulation information including the period) (step S102).

Then, the resource candidate presentation unit 123 performs extraction of an accommodation candidate resource (step S103). Specifically, the resource candidate presentation unit 123 narrows down the resources by searching through the resource capacity storage unit 132 using information of the resource name or the resource type, the resource keyword received in step S102, and among the narrowed-down resources, further narrows down, by referring to the schedule storage unit 133, the resources having the resource accommodation scheduled period including the period of requesting resource accommodation.

Then, the resource candidate presentation unit 123 performs filtering using a processing cost upper limit and a transportation cost of the accommodation candidate resource (step S104). Specifically, for the resources that have been narrowed down in step S103, the resource candidate presentation unit 123 calculates a transportation cost of making a round trip between the address 131B of a business operator possessing the resource and the address 131B of a business operator having made the resource accommodation request. Then, the resource candidate presentation unit 123, among the resources having a processing unit cost below the upper limit unit price 233C of the cost upper limit storage unit 233, specifies one resource having a low transportation cost and the processing unit cost close to the requested unit price 233B. Note that in specifying one resource, it is possible to prioritize the requested unit price, to prioritize the transportation cost, or to prioritize one having good balance therebetween, for example, by using a predetermined algorithm, weighting, and another arithmetic method. It is also possible to specify one resource by another predetermined method. It is also possible to specify not only one resource but also a plurality of (e.g. three) resources. In this case, the resource candidate presentation unit 123 performs exclusive control for avoiding double reservation of the resource among the plurality of schedule management devices 200.

Then, the resource candidate presentation unit 123 updates a state of the accommodation candidate resource that has been narrowed down as a temporary accommodation state (step S105). Specifically, for the resource that has been specified in step S104, the resource candidate presentation unit 123 excludes information equivalent to a period scheduled to be accommodated from the accommodation scheduled period 133C of the schedule storage unit 133.

Then, the resource candidate presentation unit 123 sends information on the accommodation candidate resource that has been narrowed down to an agent (schedule management device 200 that has made the resource accommodation request) (step S106).

The operation flow of the resource accommodation processing has been described as above. According to the resource accommodation processing, it is possible to extract the resources of the same type as the resource that has been requested and having an accommodation period included in a requested period, to narrow down the resources into an appropriate resource considering the cost, and to present the resource as a candidate.

Figure 12:
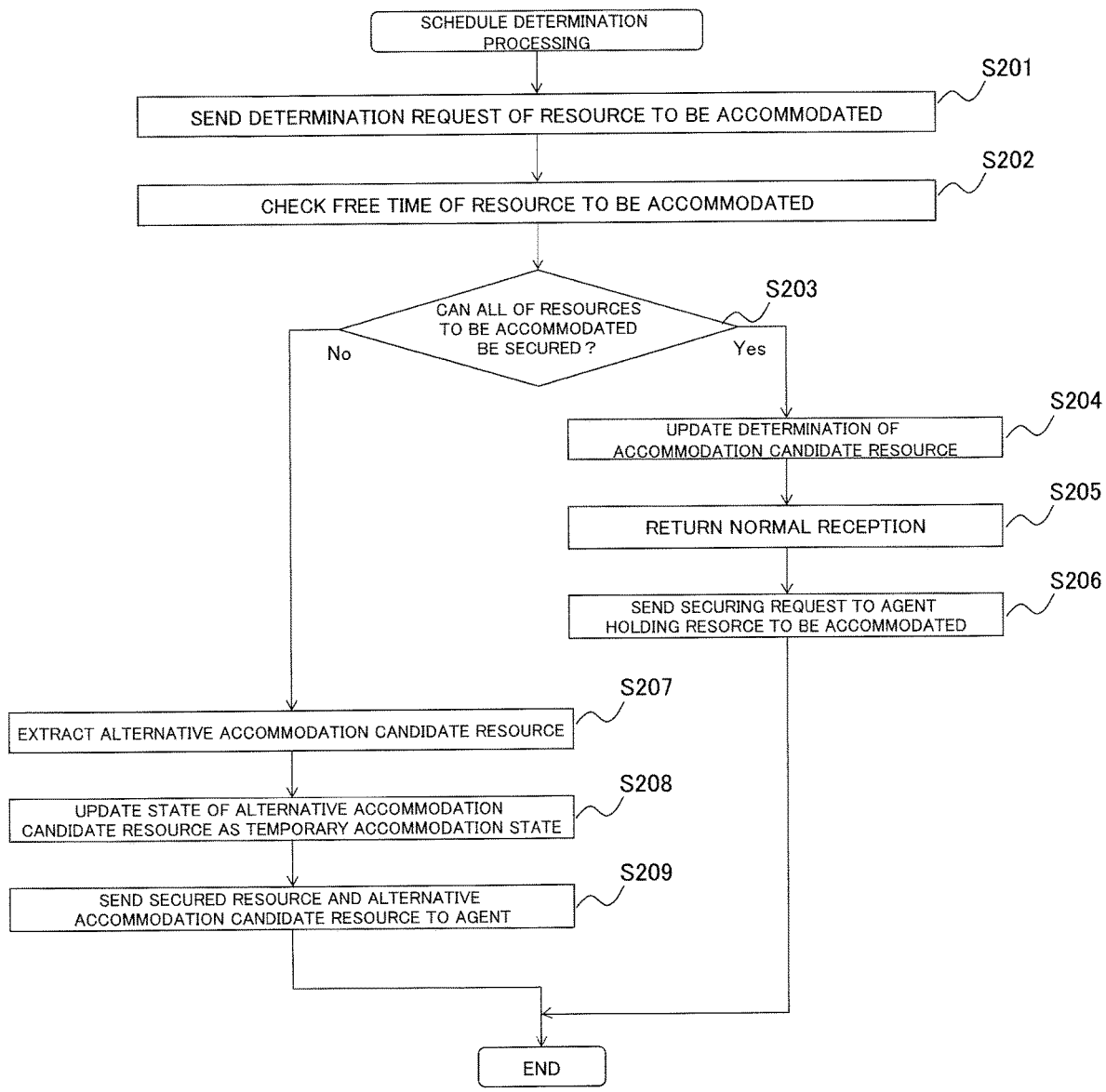
FIG. 12 is a flowchart illustrating an operation flow of schedule determination processing.

FIG. 12 is a flowchart illustrating an operation flow of the schedule determination processing. The schedule determination processing according to this embodiment is performed by the resource accommodation device 100 and the schedule management device 200. The operation flow of the schedule determination processing is started in step S007 of the schedule processing (overall) in a state where the resource accommodation device 100 and the schedule management device 200 are operating.

First, the resource requesting unit 224 of the schedule management device 200 sends a determination request of the resource to be accommodated (step S201). Specifically, the resource requesting unit 224 specifies a resource that is accommodated from another business operator among the resources included in the production schedule, which has been output in step S004 of the schedule processing (overall). Then, the resource requesting unit 224 sends information that determines use of the resource to the resource accommodation device 100.

Then, the resource reservation requesting unit 124 of the resource accommodation device 100 checks free time of the resource to be accommodated (step S202). Specifically, using the information that determines the use of the resource to be accommodated sent in step S201, the resource reservation requesting unit 124 checks that the period of use thereof is not included in the accommodation scheduled period 133C and is included in the surplus period 133B of the schedule storage unit 133. In particular, since the resource to be accommodated is in the temporary accommodation state, it is assumed that the period thereof is excluded from the accommodation period.

Then, the resource reservation requesting unit 124 determines whether or not all of the resources to be accommodated can be secured (step S203). Specifically, for the free time of each of the resources determined in step S202, the resource reservation requesting unit 124 determines whether or not all of the free times have been checked.

In a case where all of the resources to be accommodated can be secured (in a case where step S203 is "Yes"), the resource reservation requesting unit 124 performs an update of determination of the accommodation candidate resource (step S204). Specifically, for each of the accommodation candidate resources, the resource reservation requesting unit 124 performs the determination by processing of making a commitment to the schedule storage unit 133 and the like.

Then, the resource reservation requesting unit 124 receives a return of normal reception from a data base management system (DBMS) and the like for determination by the schedule storage unit 133 (step S205).

Then, the resource reservation requesting unit 124 sends a securing request to an agent holding the resource to be accommodated (step S206). Specifically, for each of the resources to be accommodated, the resource reservation requesting unit 124 sends, in a predetermined format, requesting information for determining use to the schedule management device 200 possessed by a business operator that provides the resource. Then, the resource reservation requesting unit 124 ends the schedule determination processing.

Then, in a case where all of there sources to be accommodated cannot be secured (in a case where step S203 is "No"), there source reservation requesting unit 124 extracts an alternative accommodation candidate resource for the accommodation candidate resource that cannot be secured (step S207). Specifically, the resource reservation requesting unit 124 instructs the resource candidate presentation unit 123 to specify the alternative accommodation candidate resource for each of the accommodation candidate resources that cannot be secured. The resource candidate presentation unit 123 specifies the alternative accommodation candidate resource by executing the processing from step S102 to step S104 of the resource accommodation processing again.

Then, a state of the alternative accommodation candidate resource is updated as the temporary accommodation state (step S208). Specifically, the resource reservation requesting unit 124 instructs the resource candidate presentation unit 123 to perform the same processing as that in step S105 of the resource accommodation processing on the alternative accommodation candidate resource.

Then, the resource reservation requesting unit 124 sends the resource that has been secured as well as the alternative accommodation candidate resource to the agent together with error information (step S209). Note that upon receiving the error information, the agent, or the schedule processing unit 223 of the schedule management device 200, performs step S004, or the production simulation processing, again using the alternative accommodation candidate resource.

The operation flow of the schedule determination processing has been described as above. According to the schedule determination processing, it is possible to determine reservation for using the resource that is a candidate.

Figure 13:
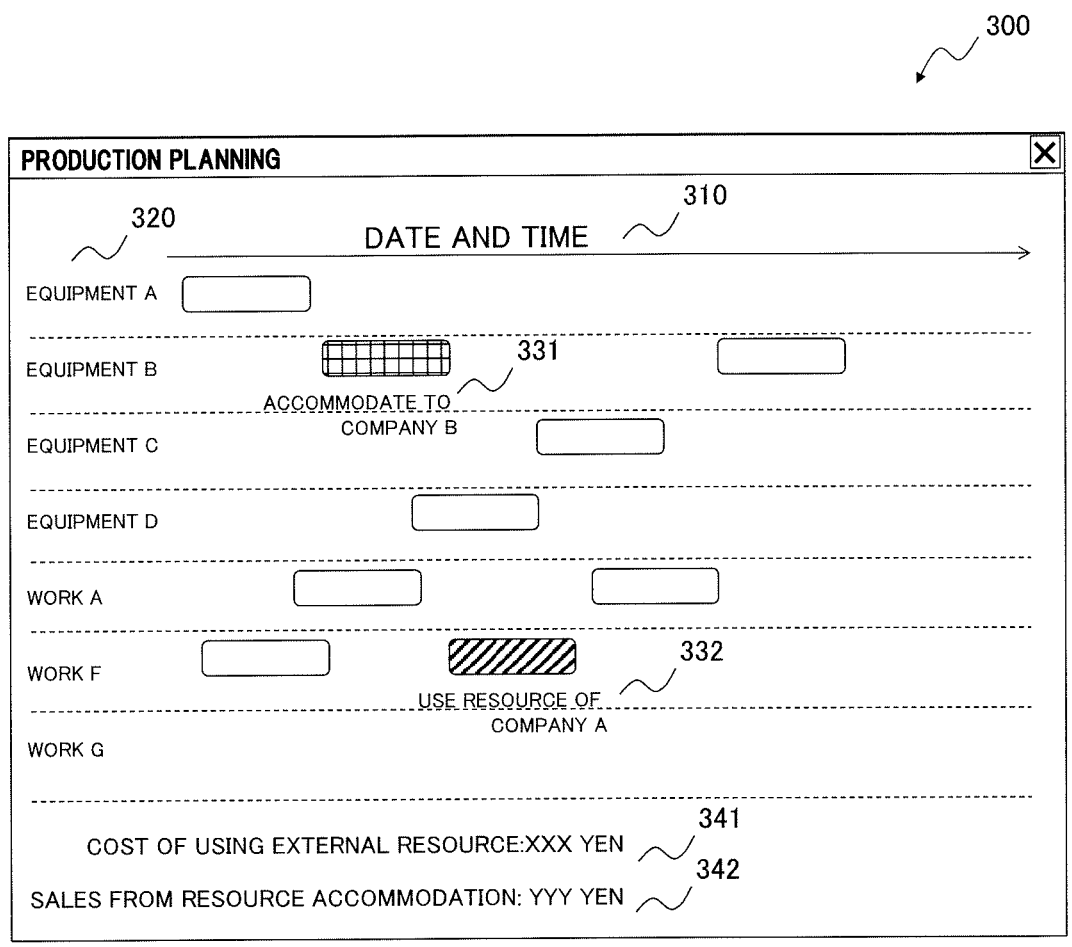
FIG. 13 is a view illustrating an exemplary output screen of the schedule processing (overall).

FIG. 13 is a view illustrating an exemplary output screen of the schedule processing (overall). In the schedule processing (overall), there is displayed a production planning screen 300 for outputting information including a schedule that has been determined. On the production planning screen 300, a screen in a Gantt chart format is displayed in which a date and time is indicated on a horizontal axis 310 and a resource is indicated on a vertical axis 320.

In the Gantt chart, an area where the resource and a usage period thereof are crossed is highlighted. In the Gantt chart, a period in which the resource is accommodated to another business operator is highlighted differently from a period in which the resource is used by the business operator itself, and furthermore, there is provided a notation 331 indicating the other business operator to which the resource is accommodated. For a period in which the resource of another business operator is used, an area where the resource and a period thereof are crossed is highlighted differently from a period in which the resource of the business operator itself is used, and furthermore, there is provided a notation 332 indicating a business operator from which the resource is accommodated. Preferably, there are displayed a display 341 indicating a cost of using an external resource and a display 342 indicating sales from resource accommodation. The exemplary production planning screen 300, which is the output screen of the schedule processing (overall), has been described as above. Note that the production planning screen 300 is not limited to the Gantt chart and may also be a chart of another format.

The resource accommodation system 1 according to the present embodiment has been described as above. According to this embodiment, it is possible to execute the production planning having appropriate responsiveness even when the number of participating companies accommodating resources is increased. Furthermore, it becomes possible for factories and the like of the participating companies to exchange and accommodate surplus equipment thereof. For example, it becomes possible to make an efficient investment in equipment by involving equipment rental businesses as well in accommodation as well as to improve energy efficiency as well. Furthermore, a synergistic effect may be obtained as the number of participating companies increases in the neighborhood, and it can be said that an effect according to the present invention is further increased The present invention is not limited to the above-described embodiment. Various modifications of the above-described embodiment are possible within the scope of the technical idea of the present invention. For example, in the above embodiment, the configurations are described in detail to describe the present invention in an easily understandable way, but the embodiment is not necessarily limited to one having all of the configurations described above.

Furthermore, at the time of actually using the resource after the above-described resource accommodation has been secured, a use result thereof is recorded so as to be shared between the schedule management device 200 and the resource accommodation device 100 to use the use result later in settlement processing of a usage fee by the settlement processing unit.

In the above-described embodiment, the production simulation processing is performed by the schedule processing unit 223 in the schedule management device 200, but it is not limited to this. For example, it is also possible to perform the processing by a predetermined server device or the like of the resource accommodation device 100 using cloud computing.

It is also possible to achieve a part or all of the configurations, functions, processing units, and the like by hardware, for example, by designing using an integrated circuit and the like. A control line and an information line considered to be necessary for a description purpose are illustrated only, whereby not necessarily all of the control lines and the information lines of the product are described. In actuality, it may be considered that substantially all of the configurations are mutually connected.

A technical element of the above-described embodiment may be applied alone or may be applied being separated into multiple parts such as a program component and a hardware component.

The present invention has been described as above mainly on the embodiment.

REFERENCE SIGNS LIST

1 . . . resource accommodation system, 50 . . . network, 100 . . . resource accommodation device, 120 . . . control unit, 121 . . . resource registration receiving unit, 122 . . . resource state management unit, 123 . . . resource candidate presentation unit, 124 . . . resource reservation requesting unit, 125 . . . resource result management unit, 126 . . . settlement processing unit, 130 . . . storage unit, 131 . . . client management information storage unit, 132 . . . resource capacity storage unit, 133 . . . schedule storage unit, 134 . . . resource allocation storage unit, 140 . . . communication unit, 150 . . . bus, 200 . . . schedule management device, 220 . . . control unit, 221 . . . resource registration unit, 222 . . . resource state reporting unit, 223 . . . schedule processing unit, 224 . . . resource requesting unit, 225 . . . resource result management unit, 226 . . . settlement processing unit, 230 . . . storage unit, 231 . . . free resource information storage unit, 232 . . . user information storage unit, 233 . . . cost upper limit storage unit, 240 . . . communication unit, and 250 . . . bus

The invention claimed is:

1. A manufacturing system, comprising:
a resource accommodation device, including a processor; and
a memory storing a program for execution by the processor, the program including instructions for
storing, via a resource registration receiving unit, a resource registration request including a type of an available resource, and an available date and time of the available resource, in a schedule storage unit;
outputting a simulated production schedule for manufacturing a product based on a predetermined method using manufacturing process information and by reading the resource registration request including the type of the available resource and the available date and time of the available resource from the schedule storage unit, wherein the simulated production schedule comprises simulated scheduled completion date, a simulated quantity, and a resource operation plan;
determining whether or not a production volume of the product is satisfied in the simulated production schedule by determining whether or not the simulated scheduled completion date of the simulated production schedule satisfies a predetermined completion date, and whether or not the simulated quantity satisfies a predetermined production request;
in a case where the production volume is not satisfied, performing bottleneck extraction processing and resource accommodation processing by
searching through, using a resource candidate presentation unit, a database of resources stored in the schedule storage unit upon receiving a resource use request including a type of a requested resource and a date and time of using the requested resource, wherein the resource use request is generated in response to the production volume not being satisfied by the simulated production schedule;

selecting a resource from the database of resources, wherein the resource satisfies a predetermined criterion, and wherein the resource is required for manufacturing the product;

designating the resource as a resource candidate having been selected, wherein the resource was unavailable for the simulated production schedule;

accommodating the resource by transmitting a resource securing request for the resource candidate to an agent; and manufacturing equipment configured to manufacture the product using the accommodated resource, and in a case where the production volume is satisfied, performing process schedule determination processing by
sending a determination request of the resource to be accommodated;
checking for free time of the resource to be accommodated;
determining whether or not all of the resources to be accommodated can be secured;
accommodating the resource by transmitting a resource securing request for the resource candidate to an agent; and
manufacturing equipment configured to manufacture the product using the accommodated resource.

2. The manufacturing system according to claim 1, wherein the resource includes any of manufacturing equipment, manufacturing personnel, and manufacturing-related work.

3. The manufacturing system according to claim 1, wherein
the predetermined criterion is a criterion related to a cost of the resource having been obtained as a result of a search.

4. The manufacturing system according to claim 1, wherein
the program further includes instructions for storing, in a resource capacity storage unit, information specifying a unit price for using the resource, and
the predetermined criterion is that the unit price for using the resource having been obtained as a result of a search is lower than a predetermined amount.

5. The manufacturing system according to claim 1, wherein
the program further includes instructions for storing, in a resource capacity storage unit, information specifying a position in association with each of a plurality of searchable resources, the resource being among the plurality of searchable resources, and
the predetermined criterion is that a transportation cost determined using the information specifying the position of the resource having been obtained as a result of a search is the lowest among the plurality of searchable resources.

6. The manufacturing system according to claim 1, wherein
the program further includes instructions for storing, in a resource capacity storage unit, information specifying a position in association with each of a plurality of searchable resources, the resource being among the plurality of searchable resources, and
wherein a criterion used for selecting the resource is that a transportation period using the information specifying the position of the resource having been obtained as a result of a search is the shortest among the plurality of searchable resources.

7. A manufacturing system, comprising:
a schedule management device including a processor; and
a memory storing a program for execution by the processor, the program including instructions for
storing, in a schedule storage unit, information specifying a type of a resource required for manufacturing a product in association with an available period of the resource;
calculating, using a schedule processing unit, a simulated production schedule for manufacturing the product by using a predetermined method based on manufacturing process information and a production volume of the product to be manufactured received by the schedule management device and by reading the information specifying the type of the resource required for manufacturing the product and the available period of the resource from the schedule storage unit, wherein the simulated production schedule comprises simulated scheduled completion date, a simulated quantity, and a resource operation plan;
determining whether or not the production volume of the product is satisfied in the simulated production schedule by determining whether or not the simulated scheduled completion date of the simulated production schedule satisfies a predetermined completion date, and whether or not the simulated quantity satisfies a predetermined production request;
in a case where the production volume is not satisfied, performing bottleneck extraction processing and resource accommodation processing by
outputting, using a resource requesting unit, a resource use request including a type of an insufficient resource and a date and time of using the insufficient resource in a case where the production volume is not satisfied by the simulated production schedule having been calculated;
receiving a resource candidate selected based on the resource use request output by the resource requesting unit, wherein the resource candidate was unavailable for the simulated production schedule;
calculating, using the schedule processing unit, an actual production schedule by the predetermined method upon receiving the resource candidate according to the resource use request having been output by the resource requesting unit;
acquiring the resource for manufacturing of the product in accordance with the actual production schedule; and
manufacturing equipment configured to manufacture the product using the acquired resource, and
in a case where the production volume is satisfied, performing process schedule determination processing by
sending a determination request of the resource to be accommodated;
checking for free time of the resource to be accommodated;
determining whether or not all of the resources to be accommodated can be secured;
accommodating the resource by transmitting a resource securing request for the resource candidate to an agent; and
manufacturing equipment configured to manufacture the product using the accommodated resource.

8. A manufacturing system, comprising:
a resource accommodation system including a resource accommodation device; and
a schedule management device,
wherein the schedule management device includes a first processor, and a first memory storing a first program for execution by the first processor, the first program including instructions for
storing, in a schedule storage unit, information specifying a type of a resource required for manufacturing a product in association with an available period of the resource;
calculating, using a schedule processing unit, a schedule by a predetermined method based on manufacturing process information and a production volume of the product to be manufactured received by the schedule management device and by reading the information specifying the type of the resource required for manufacturing the product and the available period of the resource from the schedule storage unit, wherein the simulated production schedule comprises simulated scheduled completion date, a simulated quantity, and a resource operation plan;
determining whether or not the production volume of the product is satisfied in the schedule by determining whether or not the simulated scheduled completion date of the simulated production schedule satisfies a predetermined completion date, and whether or not the simulated quantity satisfies a predetermined production request;
in a case where the production volume is not satisfied, performing bottleneck extraction processing and resource accommodation processing by
outputting, using a resource requesting unit, a resource use request including a type of an insufficient resource and a date and time of using the insufficient resource in a case where the production volume is not satisfied by the schedule having been calculated, and
wherein the resource accommodation device includes a second processor, and a second memory storing a second program for execution by the second processor, the second program including instructions for
storing, via a resource registration receiving unit, a resource registration request including a type of an available resource and an available date and time in a schedule storage unit of a predetermined resource upon receiving the resource registration request;
searching through, using a resource candidate presentation unit, a plurality of possible resources stored in the schedule storage unit upon receiving the resource use request the type of the insufficient resource and the date and time of using the insufficient resource;
selecting, using the resource candidate presentation unit, a resource from the plurality of possible resources, the resource satisfying a predetermined criterion;
designating, using the resource candidate presentation unit, the resource as a resource candidate having been selected, wherein the resource was unavailable for the schedule having been calculated;
accommodating the resource by transmitting a resource securing request for the resource candidate to an agent,
wherein the schedule processing unit of the schedule management device calculates the schedule by the predetermined method upon receiving the resource candidate from the resource candidate presentation unit;
manufacturing equipment configured to manufacture the product using the accommodated resource, and
in a case where the production volume is satisfied, performing process schedule determination processing by sending a determination request of the resource to be accommodated;
checking for free time of the resource to be accommodated;
determining whether or not all of the resources to be accommodated can be secured;
accommodating the resource by transmitting a resource securing request for the resource candidate to an agent; and
manufacturing equipment configured to manufacture the product using the accommodated resource.

9. The manufacturing system according to claim 7, wherein the resource includes at least one selected from manufacturing equipment, manufacturing personnel, and manufacturing-related work.

10. The manufacturing system according to claim 8, wherein the resource includes at least one selected from manufacturing equipment, manufacturing personnel, and manufacturing-related work.

11. The manufacturing system according to claim 8, wherein the predetermined criterion is a criterion related to a cost of the resource having been obtained as a result of a search.

12. The manufacturing system according to claim 8, wherein
the program further includes instructions for storing, in a resource capacity storage unit, information specifying a unit price for using the resource, and
the predetermined criterion is that the unit price for using the resource having been obtained as a result of a search is lower than a predetermined amount.

13. The manufacturing system according to claim 8, wherein
the program further includes instructions for storing, in a resource capacity storage unit, information specifying a position in association with each of a plurality of searchable resources, the resource being among the plurality of searchable resources, and
the predetermined criterion is that a transportation cost determined using the information specifying the position of the resource having been obtained as a result of a search is the lowest among the plurality of searchable resources.

14. The manufacturing system according to claim 8, wherein
the program further includes instructions for storing, in a resource capacity storage unit, information specifying a position in association with each of a plurality of searchable resources, the resource being among the plurality of searchable resources, and
wherein a criterion used for selecting the resource is that a transportation period using the information specifying the position of the resource having been obtained as a result of a search is the shortest among the plurality of searchable resources.

* * * * *